(12) United States Patent
Kou et al.

(10) Patent No.: US 9,891,627 B2
(45) Date of Patent: Feb. 13, 2018

(54) WORK MACHINE CONTROL SYSTEM, WORK MACHINE, WORK MACHINE MANAGEMENT SYSTEM, AND METHOD FOR CONTROLLING WORK MACHINE

(71) Applicant: Komatsu Ltd., Tokyo (JP)

(72) Inventors: Ryuuen Kou, Hiratsuka (JP); Akiharu Nishijima, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/314,214

(22) PCT Filed: Nov. 30, 2015

(86) PCT No.: PCT/JP2015/083672
§ 371 (c)(1),
(2) Date: Nov. 28, 2016

(87) PCT Pub. No.: WO2016/084981
PCT Pub. Date: Jun. 2, 2016

(65) Prior Publication Data
US 2017/0192434 A1 Jul. 6, 2017

(51) Int. Cl.
*G06F 7/70* (2006.01)
*G05D 1/02* (2006.01)
(Continued)

(52) U.S. Cl.
CPC .......... *G05D 1/0223* (2013.01); *B60K 31/04* (2013.01); *B60T 8/1755* (2013.01); *B60T 8/245* (2013.01);
(Continued)

(58) Field of Classification Search
CPC ...... G05D 1/0223; B60K 31/04; B60T 8/1755
See application file for complete search history.

(56) References Cited

U.S. PATENT DOCUMENTS 6,052,644 A 4/2000 Murakami et al.
9,418,557 B2 8/2016 Kawamata et al.
(Continued)

FOREIGN PATENT DOCUMENTS

JP 63-180531 A 7/1988
JP 08-177544 A 7/1996
(Continued)

OTHER PUBLICATIONS

International Search Report dated Feb. 23, 2016, issued for PCT/JP2015/083672.

*Primary Examiner* — Adam Alharbi
(74) *Attorney, Agent, or Firm* — Locke Lord LLP (57) ABSTRACT

A method for controlling a work machine, includes: detecting an area present ahead in a traveling direction of a work machine, in which a target traveling speed of the work machine is constant and is lower than a traveling speed at a current point of time; when the area is detected, obtaining a corrected value for correcting the accelerating instruction value; adding the corrected value and an accelerating instruction value for controlling a traveling speed of the work machine obtained based on the target traveling speed to obtain a corrected accelerating instruction value; and outputting the corrected accelerating instruction value to a drive device configured to drive a traveling device in the work machine.

13 Claims, 8 Drawing Sheets

(51) Int. Cl.
  *B60T 8/1755* (2006.01)
  *G01C 21/26* (2006.01)
  *G01C 21/20* (2006.01)
  *B60T 8/24* (2006.01)
  *B60W 40/107* (2012.01)
  *B60W 40/109* (2012.01)
  *B60K 31/04* (2006.01)
  *B60K 31/00* (2006.01)

(52) U.S. Cl.
  CPC ........ *B60W 40/107* (2013.01); *B60W 40/109* (2013.01); *G01C 21/20* (2013.01); *G01C 21/26* (2013.01); *G05D 1/028* (2013.01); *G05D 1/0212* (2013.01); *G05D 1/0268* (2013.01); *G05D 1/0289* (2013.01); *B60K 2031/0033* (2013.01); *G05D 2201/021* (2013.01)

(56) References Cited

U.S. PATENT DOCUMENTS

2011/0318157 A1* 12/2011 Okamura ................ E02F 3/436
  414/687
2014/0244084 A1* 8/2014 Raftry ................... B60W 10/02
  701/22
2017/0151946 A1* 6/2017 Shiga ................ B60W 30/143

FOREIGN PATENT DOCUMENTS

JP    2004-142690 A    5/2004
JP    2013-169956 A    9/2013

\* cited by examiner

WORK MACHINE CONTROL SYSTEM, WORK MACHINE, WORK MACHINE MANAGEMENT SYSTEM, AND METHOD FOR CONTROLLING WORK MACHINE

FIELD

The present invention relates to a work machine control system, a work machine, a work machine management system, and a method for controlling a work machine.

BACKGROUND

Various mining machines such as excavator and dump truck operate in a mining site. Patent Literature 1 describes therein a downslope speed control device for preventing a speed of a manned vehicle going downhill from largely overshooting a target traveling speed.

CITATION LIST

Patent Literature

Patent Literature 1: Japanese Laid-open Patent Publication No. 2004-142690

SUMMARY

Technical Problem

An unmanned mining machine controlled to travel in a mine at a set target traveling speed may travel in an area in which the traveling speed is limited to a low speed. In such a case, the unmanned mining machine temporarily lowers a drive force for decelerating a traveling speed to the set speed before entering the area in which the traveling speed is limited to a low speed, but if a timing to recover the drive force is then delayed, the traveling speed of the mining machine can lower below the target traveling speed. This is because a heavy work machine such as a mining machine has a large inertia force, and thus once a speed tends to lower, the machine cannot immediately travel at a constant speed. The phenomenon easily occurs to a heavy work machine such as a dump truck loading freight thereon.

According to aspects of the present invention, it is an object to prevent a traveling speed from largely lowering below a target traveling speed when an unmanned work machine controlled to travel in a mine at the set target traveling speed travels in an area in which the traveling speed is limited to a low speed.

Solution to Problem

According to a first aspect of the present invention, a work machine control system configured to control a drive device configured to drive a traveling device in a work machine, comprises: an acceleration change amount calculation unit configured to obtain an accelerating instruction value for controlling a traveling speed of the work machine based on a target traveling speed of the work machine; a detection unit configured to detect an area ahead in a traveling direction of the work machine, in which the target traveling speed is constant and is lower than a traveling speed at a current point of time; a corrected value calculation unit configured to, when the area is detected by the detection unit, obtain a corrected value for correcting the accelerating instruction value; an addition processing unit configured to add the accelerating instruction value and the corrected value to obtain a corrected accelerating instruction value; and an accelerating instruction value output unit configured to output the corrected accelerating instruction value to the drive device.

According to a second aspect of the present invention, in the work machine control system according to the first aspect, wherein traveling condition information for defining a target traveling course of the work machine includes the target traveling speed, and the detection unit is configured to detect the area by using a plurality of the target traveling speeds corresponding to a plurality of points present ahead in a traveling direction of the work machine.

According to a third aspect of the present invention, in the work machine control system according to the second aspect, wherein when a difference between a first target traveling speed at a first point present ahead in a traveling direction of the work machine and a second target traveling speed at a second point present ahead in the traveling direction of the work machine ahead of a first traveling condition information is less than a threshold, the detection unit determines that the area is detected.

According to a fourth aspect of the present invention, in the work machine control system according to any one of the first to third aspects, wherein when a deceleration of the work machine is a threshold or more, the detection unit determines that the area is detected.

According to a fifth aspect of the present invention, in the work machine control system according to any one of the first to fourth aspects, wherein the corrected value calculation unit is configured to obtain the corrected value by using an actual deceleration of the work machine.

According to a sixth aspect of the present invention, in the work machine control system according to any one of the first to fifth aspects, wherein the area includes at least one of a speed-limited area in a mine in which the work machine travels, a cross point, and a location in which a carrying route in the mine is narrow.

According to a seventh aspect of the present invention, a work machine control system configured to control a drive device configured to drive a traveling device in a work machine, comprises: an acceleration change amount calculation unit configured to obtain an accelerating instruction value for controlling a traveling speed of the work machine based on a target traveling speed of the work machine; a detection unit configured to detect that the work machine is present in a deceleration area in which the target traveling speed decreases, and that a constant-acceleration area in which the target traveling speed linearly increases is present ahead in a traveling direction of the work machine; a corrected value calculation unit configured to, when the area is detected by the detection unit, obtain a corrected value for correcting the accelerating instruction value; an addition processing unit configured to add the accelerating instruction value and the corrected value to obtain a corrected accelerating instruction value; and an accelerating instruction value output unit configured to output the corrected accelerating instruction value to the drive device.

According to an eighth aspect of the present invention, in the work machine control system according to any one of the seventh aspect, wherein the corrected value calculation unit is configured to obtain the corrected value by using an actual deceleration of the work machine and an acceleration in the constant-acceleration area.

According to a ninth aspect of the present invention, a work machine includes the work machine control system according to any one of the first to eighth aspects.

According to a tenth aspect of the present invention, a work machine management system comprises: a management device configured to output traveling condition information including the target traveling speed and a target traveling course of a work machine to the work machine according to the ninth aspect.

According to an eleventh aspect of the present invention, a method for controlling a work machine, comprises: detecting an area present ahead in a traveling direction of a work machine, in which a target traveling speed of the work machine is constant and is lower than a traveling speed at a current point of time; when the area is detected, obtaining a corrected value for correcting the accelerating instruction value; adding the corrected value and an accelerating instruction value for controlling a traveling speed of the work machine obtained based on the target traveling speed to obtain a corrected accelerating instruction value; and outputting the corrected accelerating instruction value to a drive device configured to drive a traveling device in the work machine.

According to the aspects of the present invention, it is possible to prevent a traveling speed from largely lowering below a target traveling speed when an unmanned work machine controlled to travel in a mine at the set target traveling speed travels in an area in which the traveling speed is limited to a low speed.

DESCRIPTION OF EMBODIMENTS

An exemplary embodiment for carrying out the present invention will be described in detail with reference to the drawings.

<Outline of Work Machine Management System>

Figure 1:
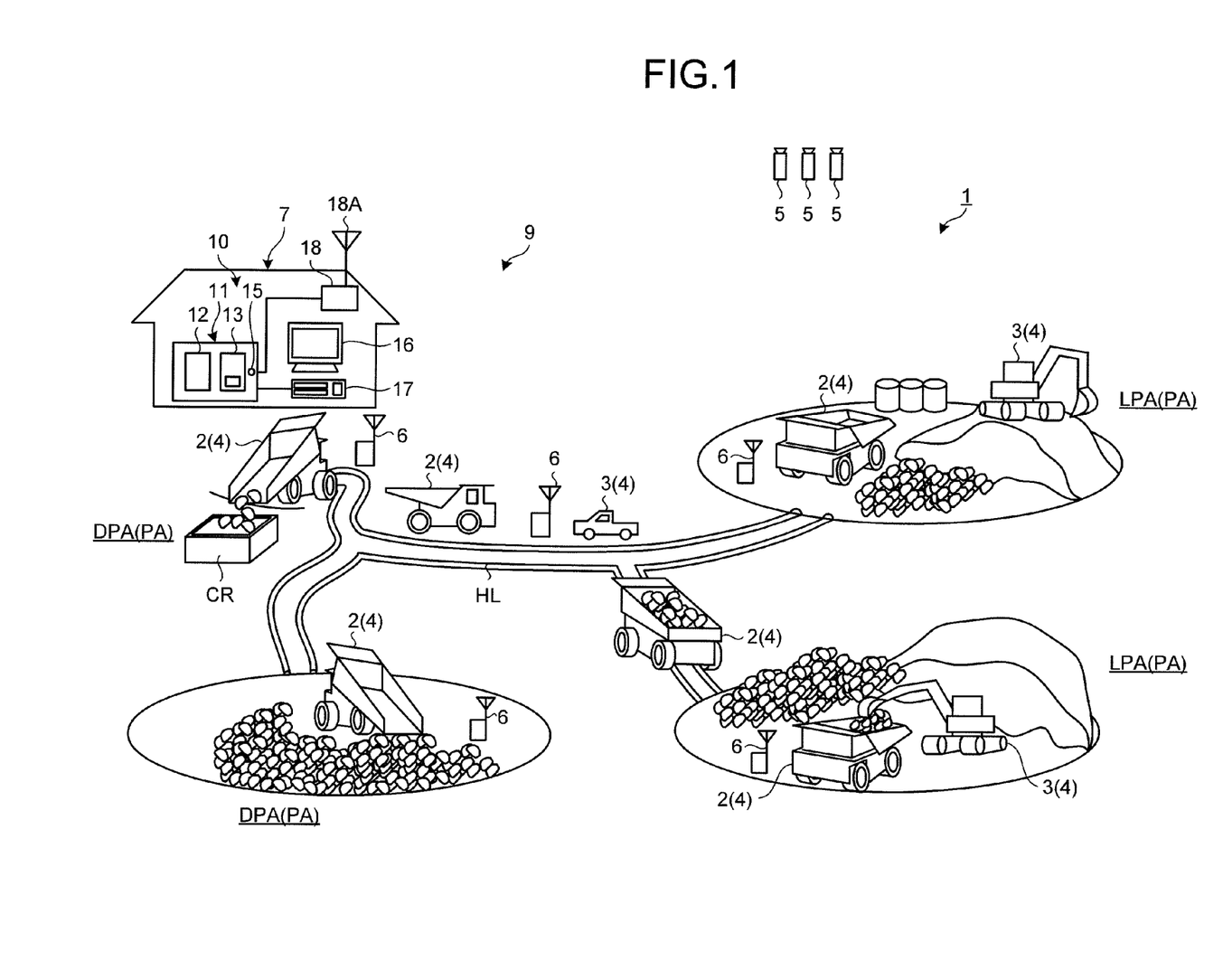
FIG. 1 is a diagram illustrating an exemplary work machine management system according to an exemplary embodiment.

FIG. 1 is a diagram illustrating an exemplary work machine management system 1 according to the present exemplary embodiment. In the following, the work machine management system 1 will be denoted as a management system 1 as needed. The management system 1 manages work machines 4. The management of the work machines 4 includes at least one of operational management of the work machines 4, productivity evaluation of the work machines 4, operator's operation technique evaluation of the work machines 4, maintenance of the work machines 4, and abnormality diagnosis of the work machines 4. The description will be made below assuming that the work machines 4 are mining machines.

The term mining machine as exemplary work machine is a collective term of machinery used for various works in a mine. The work machines 4 include at least one of a boring machine, an excavation machine, a loading machine, a transporting machine, a crushing machine, and an operator-driving vehicle. The excavation machine is a work machine for excavating a mine. The loading machine is a work machine for loading freight on a transporting machine. The loading machine includes at least one of an excavator, an electric shovel, and a wheel loader. The transporting machine is a work machine for transporting freight. The crushing machine is a work machine for crushing earth charged by a transporting machine. The work machines 4 can move in a mine.

According to the present exemplary embodiment, the work machines 4 include dump trucks 2 as transporting machines capable of traveling in a mine, and different work machines 3 from the dump trucks 2. According to the present exemplary embodiment, there will be described a case in which the dump trucks 2 are mainly managed by the management system 1.

As illustrated in FIG. 1, the dump truck 2 travels at least in a working site PA in a mine and along a carrying route HL leading to the working site PA. The dump truck 2 travels along a target traveling course set for the carrying route HL and the working site PA.

The working site PA includes at least one of a loading site LPA and a discharging site DPA. The loading site LPA is an area where a loading work of loading freight on the dump truck 2 is performed. The discharging site DPA is an area where a discharging work of discharging freight from the dump truck 2 is performed. In the example illustrated in FIG. 1, a crushing machine CR is provided in at least part of the discharging site DPA.

According to the present exemplary embodiment, the description will be made assuming that the dump truck 2 is an unmanned dump truck autonomously traveling in a mine in response to an instruction signal from a management device 10. The autonomous traveling of the dump truck 2 is to travel in response to an instruction signal from the management device 10 not via a driver's operation. The unmanned dump truck also has a function of traveling by a driver's operation when a failure occurs, for example.

In FIG. 1, the management system 1 comprises the management device 10 arranged in a control facility 7 installed in a mine, and a communication system 9. The communication system 9 includes a plurality of relaying instruments 6 for relaying at least one of data and instruction signals. The communication system 9 wirelessly communicates data or instruction signals between the management device 10 and the work machines 4. The communication system 9 wirelessly communicates data or instruction signals between the work machines 4.

According to the present exemplary embodiment, positions of the dump trucks 2 and positions of other work machines 3 are detected by use of GNSS (Global Navigation Satellite System). GNSS may be GPS (Global Positioning System) by way of example, but is not limited thereto. GNSS has a plurality of positioning satellites 5. GNSS detects a position defined by coordinate data such as latitude, longitude, and altitude. A position detected by GNSS is an absolute position defined in the global coordinate system. Positions of the dump trucks 2 and positions of other work machines 3 in a mine are detected by GNSS.

In the following description, a position detected by GNSS will be denoted as a GPS position as needed. The GPS position is an absolute position, and includes coordinate data such as latitude, longitude and altitude. The absolute position includes an estimated position of the dump truck 2 estimated at high accuracy.

<Management Device 10>

The management device 10 will be described below. The management device 10 transmits at least one of data and instruction signals to the work machines 4 and receives data from the work machines 4. As illustrated in FIG. 1, the management device 10 comprises a computer 11, a display device 16, an input device 17, and a wireless communication device 18.

The computer 11 comprises a processing device 12, a storage device 13, and an I/O unit 15. The display device 16, the input device 17, and the wireless communication device 18 are connected to the computer 11 via the I/O unit 15.

The processing device 12 performs a calculation processing for managing the work machines 4. The storage device 13 is connected to the processing device 12 and stores therein data for managing the work machines 4. The input device 17 is directed for inputting the data for managing the work machines 4 in the processing device 12. The processing device 12 performs the calculation processing by use of the data stored in the storage device 13, the data input from the input device 17, and the data acquired via the communication system 9. The display device 16 displays calculation processing results and the like of the processing device 12.

The wireless communication device 18 is arranged in the control facility 7, includes an antenna 18A, and is connected to the processing device 12 via the I/O unit 15. The communication system 9 includes the wireless communication device 18. The wireless communication device 18 can receive data transmitted from the work machines 4, and the received data is output to the processing device 12 and is stored in the storage device 13. The wireless communication device 18 can transmit data to the work machines 4.

Figure 2:
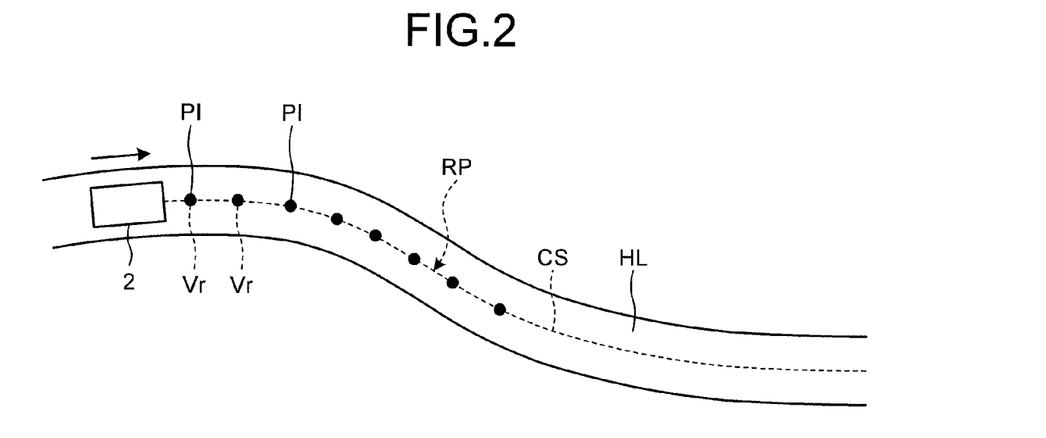
FIG. 2 is a schematic diagram illustrating a dump truck traveling along a carrying route.

FIG. 2 is a schematic diagram illustrating the dump truck 2 traveling along the carrying route HL. The processing device 12 in the management device 10 functions as a traveling condition information generation unit for generating traveling condition information including target traveling speeds Vr and a target traveling course RP of the dump truck 2 traveling in a mine. The target traveling course RP is defined by course data CS. The course data CS is a set of points PI defined with absolute positions (coordinates), respectively. A trajectory passing through the points PI is a target traveling course RP. The processing device 12 sets the target traveling speeds Vr of the dump truck 2 for the points PI, respectively. The management device 10 outputs the traveling condition information including the target traveling course RP having a plurality of points PI and the target traveling speeds Vr at the respective points PI to the dump truck 2 via the communication system 9. The dump truck 2 travels in a mine according to the traveling condition information transmitted from the management device 10.

<Dump Truck 2>

Figure 3:
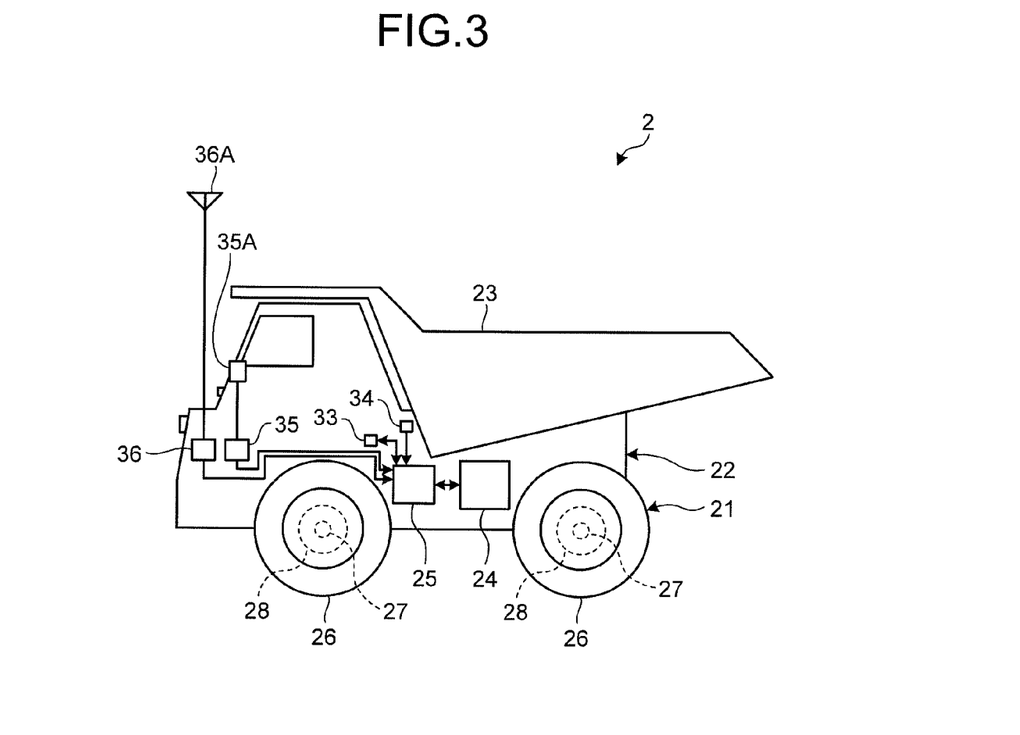
FIG. 3 is a diagram schematically illustrating an exemplary dump truck according to the exemplary embodiment.
Figure 4:
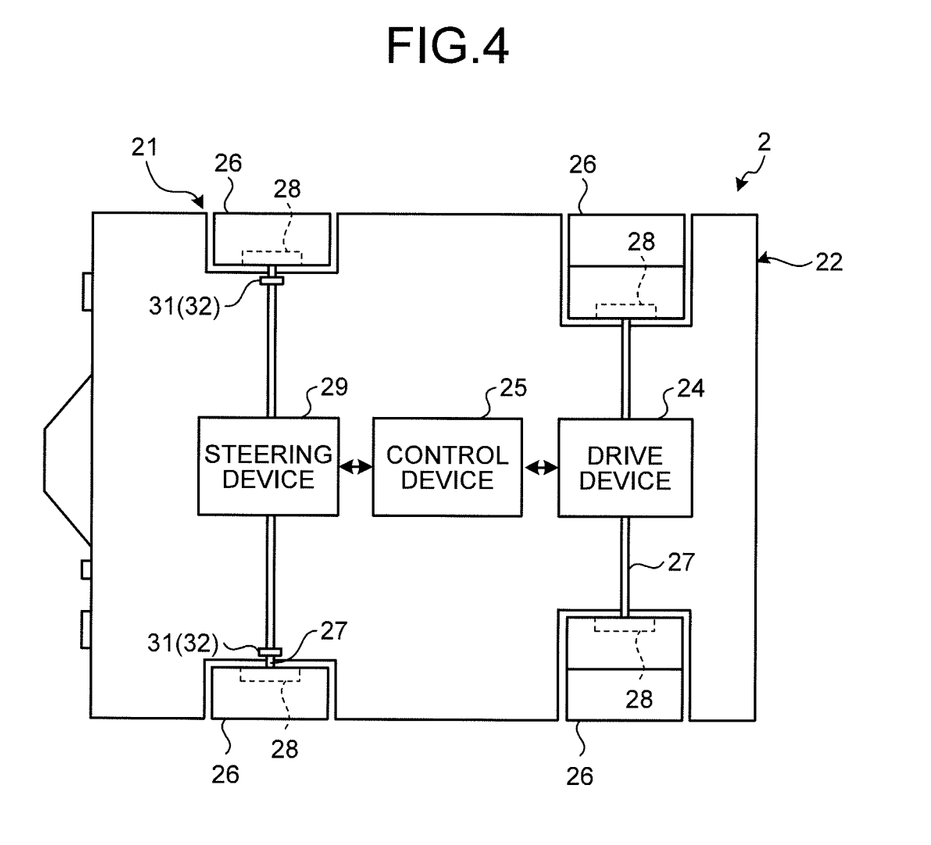
FIG. 4 is a diagram schematically illustrating an exemplary dump truck according to the exemplary embodiment.

FIG. 3 and FIG. 4 are the diagrams schematically illustrating an exemplary dump truck 2 according to the present exemplary embodiment.

The dump truck 2 comprises a traveling device 21 for causing the dump truck 2 to travel, a vehicle main body 22 attached with the traveling device 21, a vessel 23 supported on the vehicle main body 22, a drive device 24 for driving the traveling device 21, and a control device 25.

The traveling device 21 includes wheels 26, axles 27 for rotatably supporting the wheels 26, braking devices 28 for braking the wheels 26, and a steering device 29 capable of adjusting a traveling direction.

The traveling device 21 operates by a drive force generated by the drive device 24. The drive device 24 generates a drive force for accelerating the dump truck 2. The drive device 24 drives the traveling device 21 in an electric drive system. The drive device 24 includes an internal combustion engine such as a diesel engine, a generator operating by power of the internal combustion engine, and a motor operating by power generated by the generator. A drive force generated by the motor is transmitted to the wheels 26 of the traveling device 21. The wheels 26 rotate by the drive force generated by the motor thereby to cause the dump truck 2 to travel. In this way, the dump truck 2 travels by the drive force of the drive device 24 provided in the vehicle main body 22. Output of the drive device 24 is adjusted so that a traveling speed of the dump truck 2 is adjusted. The drive device 24 is not limited to the electric drive system. The drive device 24 may employ a drive system in which power generated by the internal combustion engine is transmitted to the wheels 26 of the traveling device 21 via a power transmission device.

The steering device 29 adjusts a traveling direction of the traveling device 21. A traveling direction of the dump truck 2 includes an orientation of the front of the vehicle main body 22. The steering device 29 changes an orientation of the wheels 26 thereby to adjust a traveling direction of the dump truck 2.

The braking device 28 generates a braking force for decelerating or stopping the dump truck 2. The control device 25 outputs an accelerating instruction signal for operating the drive device 24, a braking instruction signal for operating the braking devices 28, and a steering instruction signal for operating the steering device 29. The drive device 24 generates a drive force for accelerating the dump truck 2 in response to the accelerating instruction signal output from the control device 25. The braking device 28 generates a braking force for decelerating or stopping the dump truck 2 in response to the braking instruction signal output from the control device 25. The steering device 29 generates a force for changing an orientation of the wheels 26 in order to cause the dump truck 2 to travel straight or turn in response to the steering instruction signal output from the control device 25.

In the following description, a state in which an accelerating instruction signal is output from the control device 25 and the drive device 24 generates a drive force thereby to accelerate the drum truck 2 will be referred to as an acceleration state as needed, and a state in which the dump truck 2 travels at a constant speed by a drive force generated by the drive device 24 will be referred to as a constant speed state as needed. Further, in the following description, a state in which a braking instruction signal is output from the control device 25 and the braking device 28 generates a braking force thereby to decelerate the dump truck 2 will be referred to as a deceleration state as needed. Furthermore, in the following description, a state in which the dump truck 2 travels while both of an accelerating signal and a braking instruction signal from the control device 25 are stopped, the drive device 24 does not generate a drive force and the braking device 28 does not generate a braking force will be referred to as a coasting state as needed.

The dump truck 2 comprises a traveling speed detector 31 for detecting a traveling speed Vs of the dump truck 2, an acceleration detector 32 for detecting an acceleration As of the dump truck 2, and a loading capacity detector 34 for detecting a loading capacity of freight loaded on the vessel 23. The dump truck 2 comprises a position detector 35 for detecting a position of the dump truck 2, and a wireless communication device 36 for making communication with the management device 10 illustrated in FIG. 1, for example.

The traveling speed detector 31 detects a traveling speed Vs of the dump truck 2. The traveling speed detector 31 includes a rotation speed sensor for detecting a rotation speed of the wheels 26. A rotation speed of the wheels 26 is correlated with a travelling speed Vs of the dump truck 2, and thus a rotation speed value as a detected value of the rotation speed sensor is converted into a traveling speed value of the dump truck 2. The traveling speed detector 31 may detect a rotation speed of the axels 27.

The acceleration detector 32 detects an acceleration As of the dump truck 2. An acceleration As of the dump truck 2 includes a positive acceleration and a negative acceleration (deceleration). According to the present exemplary embodiment, the calculation processing is performed based on a rotation speed value as a detected value of the rotation speed sensor for detecting a rotation speed of the wheels 26, and thus the rotation speed value is converted into an acceleration value of the dump truck 2. More specifically, the acceleration detector 32 derives an acceleration As of the dump truck 2 based on a difference in traveling speed Vs for a predetermined time. For example, an acceleration As is derived based on a difference in traveling speed Vs for 0.5 [sec]. The traveling speed detector 31 and the acceleration detector 32 may be separate detectors.

The loading capacity detector 34 detects a loading capacity of freight loaded on the vessel 23. A weight of the dump truck 2 in an empty state in which no freight is loaded on the vessel 23 is well-known data. The loading capacity detector 34 detects a loading capacity of freight loaded on the vessel 23, and detects a total weight M of the dump truck 2 based on the detected value of the loading capacity and the weight of the dump truck 2 in the empty state, which is the well-known data.

The position detector 35 includes a GPS receiver, and detects a GPS position (coordinate) of the dump truck 2. The position detector 35 includes a GPS antenna 35A. The antenna 35A receives radio waves from the positioning satellites 5. The position detector 35 converts a signal based on radio waves from the positioning satellites 5 received by the antenna 35A into an electric signal, thereby to calculate a position of the antenna 35A. A GPS position of the antenna 35A is calculated thereby to detect a GPS position of the dump truck 2.

The communication system 9 includes the wireless communication device 36 provided in the dump truck 2. The wireless communication device 36 includes an antenna 36A. The wireless communication device 36 can make wireless communication with the management device 10 illustrated in FIG. 1.

The management device 10 transmits an instruction signal including the traveling condition information of the dump truck 2 to the control device 25 via the communication system 9. The control device 25 controls at least one of the drive device 24, the braking devices 28, and the steering device 29 in the dump truck 2 based on the traveling condition information supplied from the management device 10 such that the dump truck 2 travels according to the traveling condition information (including the target traveling course RP having a plurality of points PI and the target traveling speeds Vr of the respective points PI).

<Control System>

Figure 5:
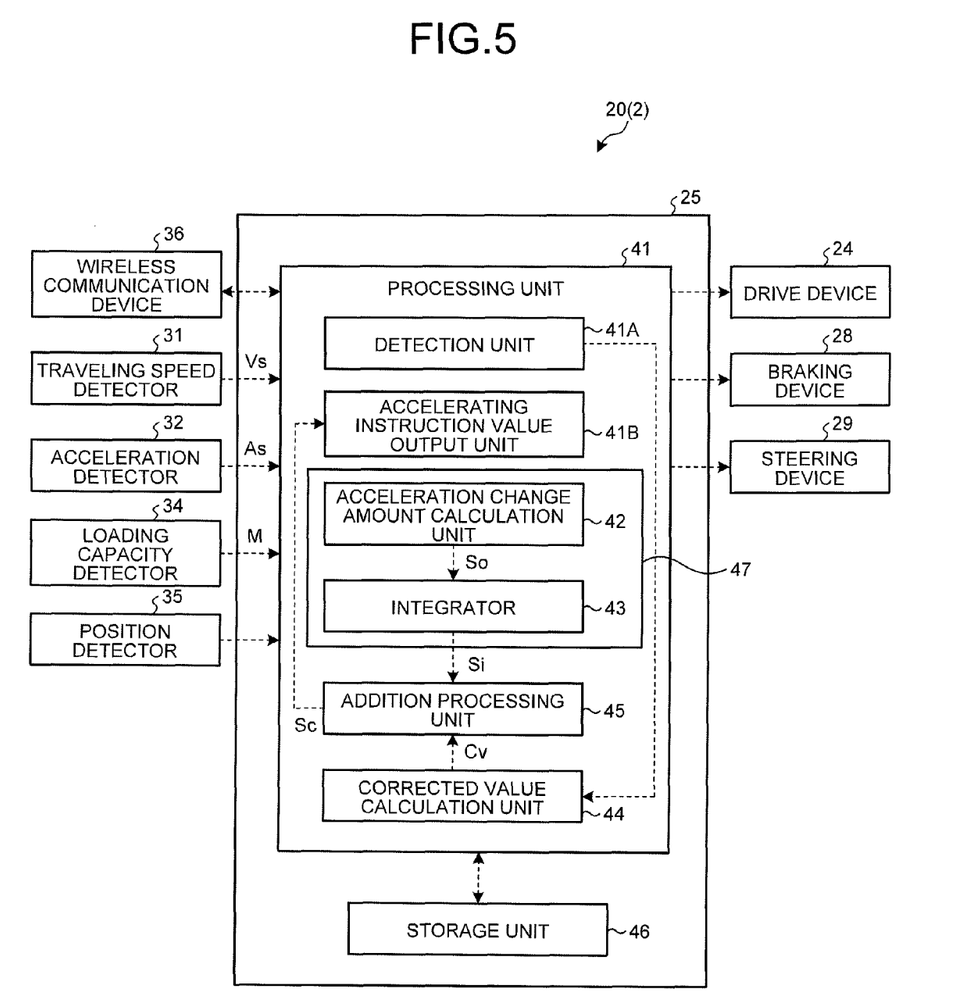
FIG. 5 is a control block diagram of a work machine control system according to the exemplary embodiment.

FIG. 5 is a control block diagram of a work machine control system 20 according to the present exemplary embodiment. In the following, the work machine control system 20 will be denoted as a control system 20 as needed. The control system 20 is mounted on the dump truck 2.

As illustrated in FIG. 5, the control system 20 comprises the wireless communication device 36, the traveling speed detector 31, the acceleration detector 32, the loading capacity detector 34, the position detector 35, the control device 25, the drive device 24, the braking devices 28, and the steering device 29.

The control device 25 comprises a processing unit 41 and a storage unit 46. The processing unit 41 comprises a detection unit 41A, an accelerating instruction value output unit 41B, an accelerating instruction value calculation unit 47 including an acceleration change amount calculation unit 42 and an integrator 43, a corrected value calculation unit 44, and an addition processing unit 45. The control device 25 comprises a braking instruction value calculation unit for operating the braking devices 28, and a steering instruction value calculation unit for operating the steering device 29, but a description thereof will be omitted in the present exemplary embodiment, and an accelerating instruction value for operating the drive device 24 will be mainly described.

The processing unit 41 acquires instruction data including the traveling condition information from the management device 10 output from the wireless communication device 36, traveling speed data indicating a traveling speed Vs of the dump truck 2 output from the traveling speed detector 31, acceleration data indicating an acceleration As of the dump truck 2 output from the acceleration detector 32, loading capacity data indicating a loading capacity M of the dump truck 2 output from the loading capacity detector 34, and position data indicating a position of the dump truck 2 output from the position detector 35. The processing unit 41 outputs an accelerating instruction signal to the drive device 24, outputs a braking instruction signal to the braking devices 28, and outputs a steering instruction signal to the steering device 29. A constant target traveling speed Vr assumes that the target traveling speed Vr increases or decrease within a predetermined range in a constant-speed area.

The detection unit 41A detects an area present ahead in a traveling direction of the dump truck 2, in which the target traveling speed Vr is constant and is lower than a current traveling speed. The area will be referred to as constant-speed area below.

The acceleration change mount calculation unit 42 calculates the amount of acceleration change So for accelerating and decelerating the dump truck 2. According to the present exemplary embodiment, the acceleration change amount calculation unit 42 calculates the amount of acceleration change So as the amount of acceleration to be changed for an accelerating instruction value at a current point of time based on at least the traveling speed data and the acceleration data of the dump truck 2 such that the dump truck 2 travels at the target traveling speed Vr.

For example, when calculating the amount of acceleration change So, map data on two variables including a speed deviation between an actual traveling speed Vs and the target traveling speed Vr of the dump truck 2 at a current point of time, and an acceleration of the dump truck 2 at the current point of time is previously prepared, and the amount of acceleration change So may be determined based on the map data. The acceleration change amount calculation unit 42 calculates the amount of acceleration change So at determined cycles T.

The integrator 43 performs an integration processing on the amount of acceleration change So calculated by the acceleration change amount calculation unit 42, and outputs the amount of acceleration change So subjected to the integration processing as an accelerating instruction value Si. The integration processing by the integrator 43 is similar as in typical integrators. The amount of acceleration change So is passed through the integrator 43 so that a variation in the accelerating instruction value becomes gentle. According to the present exemplary embodiment, the integrator 43 adds the amount of acceleration change So acquired from the acceleration change amount calculation unit 42 at a current point of time to the accelerating instruction value Si subjected to the integration processing by the integrator 43 at a past point of time, or at the cycle T before the current point of time, thereby outputting the accelerating instruction value Si subjected to the integration processing. That is, the accelerating instruction value calculation unit 47 outputs the accelerating instruction value Si by use of the amount of acceleration change So calculated by the acceleration change amount calculation unit 42 and the integrator 43.

As described below, when a constant-speed area is detected by the detection unit 41A, the corrected value calculation unit 44 finds a corrected value Cv to be added to the accelerating instruction value Si. More specifically, an actual deceleration (acceleration deviation De) of the dump truck 2 at a current point of time is multiplied by a total weight M of the dump truck 2 thereby to find a drive force (torque) Tq required for the traveling of the dump truck 2. The calculation assumes that as much the corrected value Cv is added to the accelerating instruction value as the actual deceleration of the dump truck 2 at the current point of time is compensated for, and as the deceleration of the dump truck 2 at the current point of time is larger, the corrected value Cv is also higher. The actual deceleration of the dump truck 2 may be an acceleration As detected by the acceleration detector 32 illustrated in FIG. 5, or may be found by differentiating an actual traveling speed Vs of the dump truck 2 detected by the traveling speed detector 31 by a time. A deceleration may be found based on a degree of decrease (negative acceleration) in the target traveling speed Vr without the use of an actual deceleration of the dump truck 2.

The corrected value calculation unit 44 may take into consideration a weight of the dump truck 2 in the empty state, an automobile rank of the dump truck 2, and the like when finding a corrected value Cv. This is because as a weight and an automobile rank of the dump truck are higher, an inertia force of the dump truck 2 also increases.

The addition processing unit 45 adds the accelerating instruction value Si found by the accelerating instruction value calculation unit 47 and the corrected value Cv found by the corrected value calculation unit 44 thereby to find a corrected accelerating instruction value Sc.

The accelerating instruction value output unit 41B outputs the corrected accelerating instruction value Sc found by the addition processing unit 45 to the drive device 24. The drive device 24 generates a drive force according to the corrected accelerating instruction value Sc output from the accelerating instruction value output unit 41B.

<Control During Traveling>

There will be described exemplary control when the dump truck 2 travels in the carrying route HL in a mine illustrated in FIG. 1. The traveling condition information including the target traveling speeds Vr is transmitted from the management device 10 to the dump truck 2. The control device 25 in the dump truck 2 controls the drive device 24 in the dump truck 2 such that the dump truck 2 travels at the target traveling speeds Vr.

The control device 25 determines the amount of acceleration change So based on the map data including a speed deviation as a difference between an actual traveling speed Vs and the target traveling speed Vr as a detection result of the traveling speed detector 31, and an acceleration As of the dump truck 2 at a current point of time as a detection result of the acceleration detector 32, and finally outputs an accelerating instruction value thereby to enter the acceleration state. The acceleration state defines a state in which the accelerating instruction value for driving the drive device 24 has a positive value (value higher than zero), and includes a state in which the accelerating instruction value changes to be lower than at a current point of time, or a state in which the accelerator is less stepped to decelerate, for example.

As a result of the calculation of the accelerating instruction value based on the map data using the speed deviation and the acceleration, the control device 25 may set the accelerating instruction value at zero or in the coasting state. More specifically, as described above, the accelerating instruction value calculation unit 47 employs the integrator 43, and thus the accelerating instruction value does not rapidly reach zero but the accelerating instruction value gradually decreases and finally reaches zero. Therefore, even if an actual traveling speed Vs slightly exceeds a target traveling speed Vr, the dump truck 2 is not immediately switched to the coasting state. The control device 25 prevents the drive device 24 from being largely out of a target traveling speed Vr while basically traveling in the acceleration state and sometimes switching to the coasting state, thereby causing the dump truck 2 to travel. When decelerating or stopping the dump truck 2, the control device 25 stops outputting the accelerating instruction signal, and operates the braking devices 28.

<Control when Dump Truck 2 Enters Constant-Speed Area ALT and Travels in Constant-Speed Area ALT>

Figure 6:
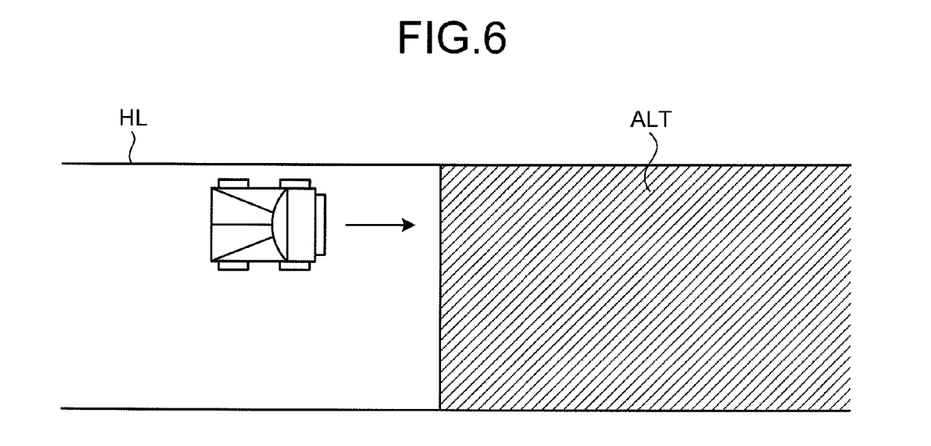
FIG. 6 is a diagram illustrating a state when a dump truck travels in a constant-speed area.
Figure 7:
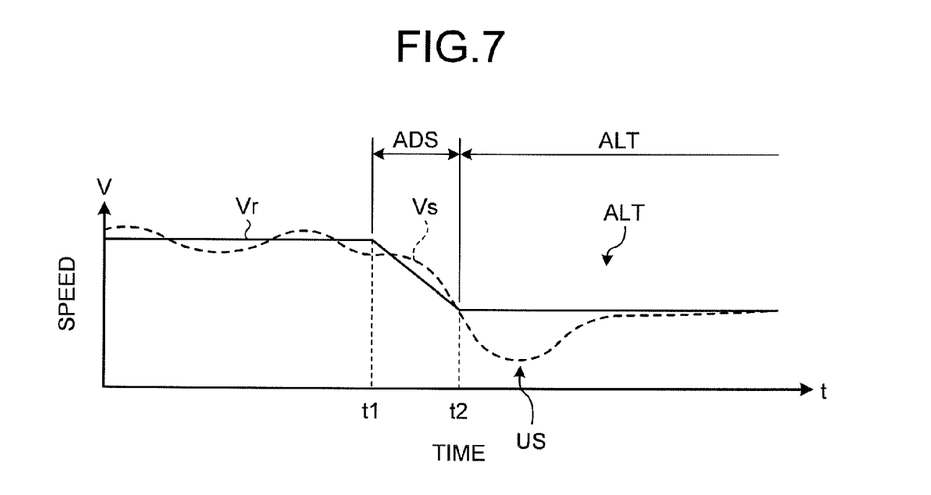
FIG. 7 is a diagram illustrating a relationship between a traveling speed as well as a target traveling speed and a time when a dump truck travels in a constant-speed area.

FIG. 6 is a diagram illustrating a state in which the dump truck 2 travels in a constant-speed area ALT. FIG. 7 is a diagram illustrating a relationship between a traveling speed Vs as well as a target traveling speed Vr and a time t when the dump truck 2 travels in the constant-speed area ALT. The vertical axis in FIG. 7 indicates a speed V and the horizontal axis indicates a time t. FIG. 6 and FIG. 7 illustrate the examples in which an area in which a target traveling speed Vr is constant and is lower than an actual traveling speed Vs is provided along the carrying route HL in a traveling direction of the dump truck 2. Such an area will be referred to as constant-speed area ALT. The target traveling speed Vr is constant within the constant-speed area ALT. The constant-speed area ALT may be provided at places where slip accidents easily occur due to rain or the like, for example. The dump truck 2 needs to lower the traveling speed Vs before the constant-speed area ALT, and thus there is set a deceleration area ADS in which the target traveling speed Vr gradually lowers before the constant-speed area ALT. In the example illustrated in FIG. 7, a period between time t1 and time t2 corresponds to the deceleration area (this is similarly applicable to the following examples).

In the deceleration area ADS before the constant-speed area ALT, the control device 25 gradually lowers the accelerating instruction value in order to lower the traveling speed Vs of the dump truck 2 such that the traveling speed Vs of the dump truck 2 follows the gradually-lowering target traveling speed Vr. Thereafter, the control device 25 outputs a predetermined accelerating instruction value thereby to cause the dump truck 2 to travel at a constant speed in order to cause the dump truck 2 to travel at the set target traveling speed Vr in the constant-speed area ALT after the dump truck 2 enters the constant-speed area ALT.

However, immediately after time t2 when the dump truck 2 enters the constant-speed area ALT, the control device 25 controls the accelerating instruction value such that the traveling speed Vs of the dump truck 2 reaches the set target traveling speed Vr in the constant-speed area ALT, but remarkable undershoot is caused for the traveling speed Vs of the dump truck 2 as indicated by US in FIG. 7. Undershoot of a traveling sped Vs is a phenomenon in which the traveling speed Vs of the dump truck 2 lowers below a target traveling speed Vr. This is because a heavy machine such as the dump truck 2 has a large inertia force, and thus once the traveling speed Vs tends to lower, a large amount of drive force is required for flattening the trend.

According to the present exemplary embodiment, in order to prevent undershoot of a traveling speed Vs immediately after the entry into the constant-speed area ALT, when detecting the constant-speed area ALT based on the information on the target traveling speeds Vr included in the traveling condition information transmitted from the management device 10 illustrated in FIG. 1 to the dump truck 2, the control device 25 adds the acceleration corrected value to the accelerating instruction value. Detailed contents of the control for preventing undershoot of a traveling speed Vs will be described below.

<Control for Preventing Undershoot of Traveling Speed Vs>

Figure 8:
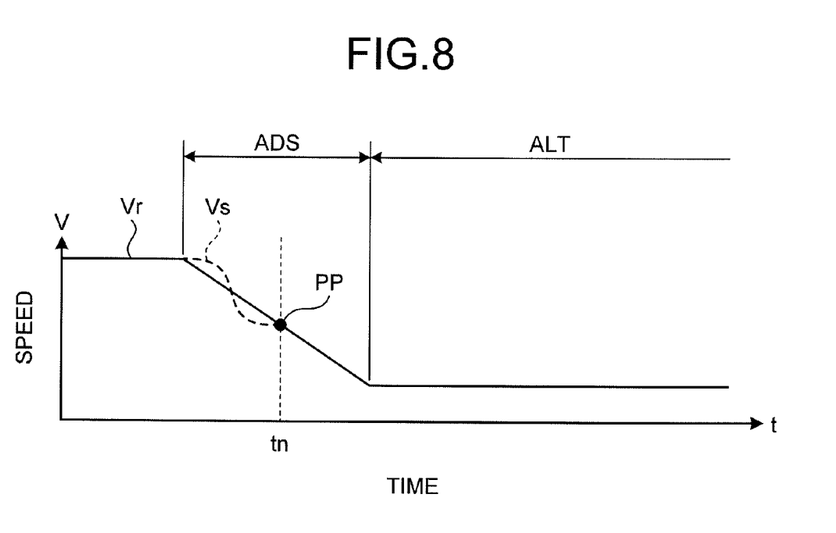
FIG. 8 is a diagram for explaining exemplary control for preventing undershoot of a traveling speed.

FIG. 8 is a diagram for explaining exemplary control for preventing undershoot of a traveling speed Vs. The vertical axis in FIG. 8 indicates a speed V, and the horizontal axis indicates a time t. A solid line in FIG. 8 indicates a target traveling speed Vr, and a broken line indicates an actual traveling speed Vs of the dump truck 2. According to the present exemplary embodiment, the control device 25 in the control system 20 detects the presence of a constant-speed area ALT present ahead in a traveling direction of the dump truck 2 by the detection unit 41A at a position PP at a certain point of time or at time to in the example illustrated in FIG. 8 in the deceleration area ADS before the dump truck 2 reaches the constant-speed area ALT. When a constant-speed area ALT is detected, the control device 25 finds a corrected value Cv, and makes a correction of adding the resultant corrected value Cv to the accelerating instruction value Si. There will be described below how the detection unit 41A in the control device 25 detects a constant-speed area ALT by way of example.

Figure 9:
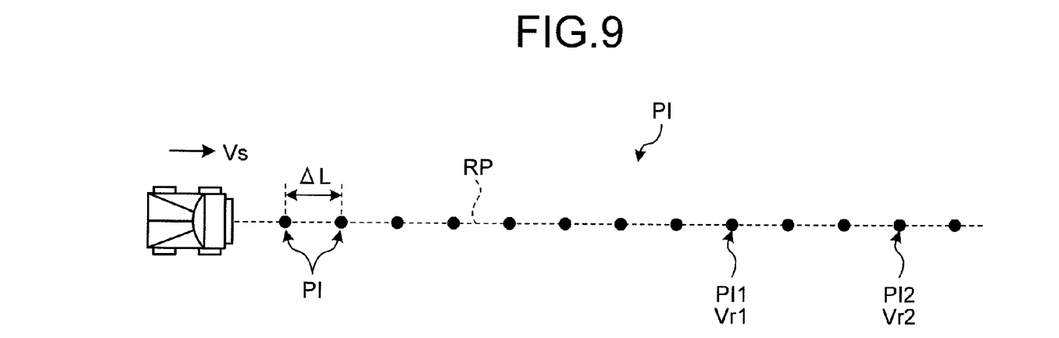
FIG. 9 is a diagram illustrating how a detection unit detects a constant-speed area by way of example.

FIG. 9 is a diagram illustrating how the detection unit 41A detects a constant-speed area ALT by way of example. According to the present exemplary embodiment, the detection unit 41A detects a constant-speed area ALT by use of a plurality of target traveling speeds Vr included in a plurality of items of traveling condition information present ahead in a traveling direction of the dump truck 2. The traveling condition information, as illustrated in FIG. 2, includes a target traveling course RP, or a set of points PI defined with absolute positions, respectively, and the target traveling speeds Vr corresponding to the respective points PI. That is, according to the present exemplary embodiment, the detection unit 41A detects a constant-speed area ALT by use of a plurality of target traveling speeds Vr corresponding to a plurality of points PI present ahead in a traveling direction of the dump truck 2.

In the example illustrated in FIG. 9, the dump truck 2 travels at a traveling speed Vs in a direction indicated by an arrow, or goes ahead. A plurality of points PI are present ahead in a traveling direction of the dump truck 2. According to the present exemplary embodiment, as illustrated in FIG. 9, the points PI are set at determined intervals ΔL. According to the present exemplary embodiment, the detection unit 41A detects a constant-speed area ALT by use of a first target traveling speed Vr1 (corresponding to first traveling condition information) at a first point PI1 present ahead in the traveling direction of the dump truck 2, and a second target traveling speed Vr2 (corresponding to second traveling condition information) at a second point PI2 present ahead in the traveling direction of the dump truck 2 ahead of the first point PI1. When a difference ΔVr between the first target traveling speed Vr1 and the second target traveling speed Vr2 is less than a predetermined threshold, the detection unit 41A determines that a constant-speed area ALT has been detected. The first point PI1 and the second point PI2 may be designated as appropriate as to how far they are away from a current position of the dump truck 2.

How the detection unit 41A detects a constant-speed area ALT is not limited to the aforementioned method. The detection unit 41A may detect a constant-speed area ALT based on a difference ΔVr between the first target traveling speed Vr1 at the first point PI1 away from the dump truck 2 by a predetermined distance at a certain time ta, and the second target traveling speed Vr2 at the first point PI1 at time tb a predetermined time after the time ta, for example.

The detection unit 41A may detect a constant-speed area ALT by additional use of a third target traveling speed Vr3 (corresponding to third traveling condition information) at the third point present ahead in the traveling direction of the dump truck 2 ahead of the second traveling condition information. That is, a constant-speed area ALT is detected by use of the respective target traveling speeds Vr included in at least two items of traveling condition information. When a constant-speed area ALT is detected by use of the respective target traveling speeds Vr included in three or more items of traveling condition information, if a variation in the respective target traveling speeds Vr is less than a predetermined threshold, for example, the detection unit 41A determines that a constant-speed area ALT has been detected.

Undershoot of a speed is caused on an entry into a constant-speed area ALT assuming that a deceleration area is provided before an entry into the constant-speed area ALT, and thus according to the present exemplary embodiment, the detection unit 41A may determine that a constant-speed area ALT has been detected assuming that a difference between the first target traveling speed Vr1 and the second target traveling speed Vr2 is less than a threshold and a deceleration of the dump truck 2 is a threshold or more (higher than a threshold). Further, according to the present exemplary embodiment, when the conditions are kept met for a predetermined period of time, the detection unit 41A may determine that a constant-speed area ALT has been detected.

When a detection flag Fg is turned ON or a constant-speed area ALT is detected, the corrected value calculation unit 44 illustrated in FIG. 5 finds a corrected value Cv for the accelerating instruction value Si as described above. The addition processing unit 45 adds the accelerating instruction value Si and the corrected value Cv thereby to find a corrected accelerating instruction value Sc. The accelerating instruction value output unit 41B outputs the corrected accelerating instruction value Sc found by the addition processing unit 45 to the drive device 24. The drive device 24 generates a drive force according to the corrected accelerating instruction value Sc output from the accelerating instruction value output unit 41B.

Figure 10:
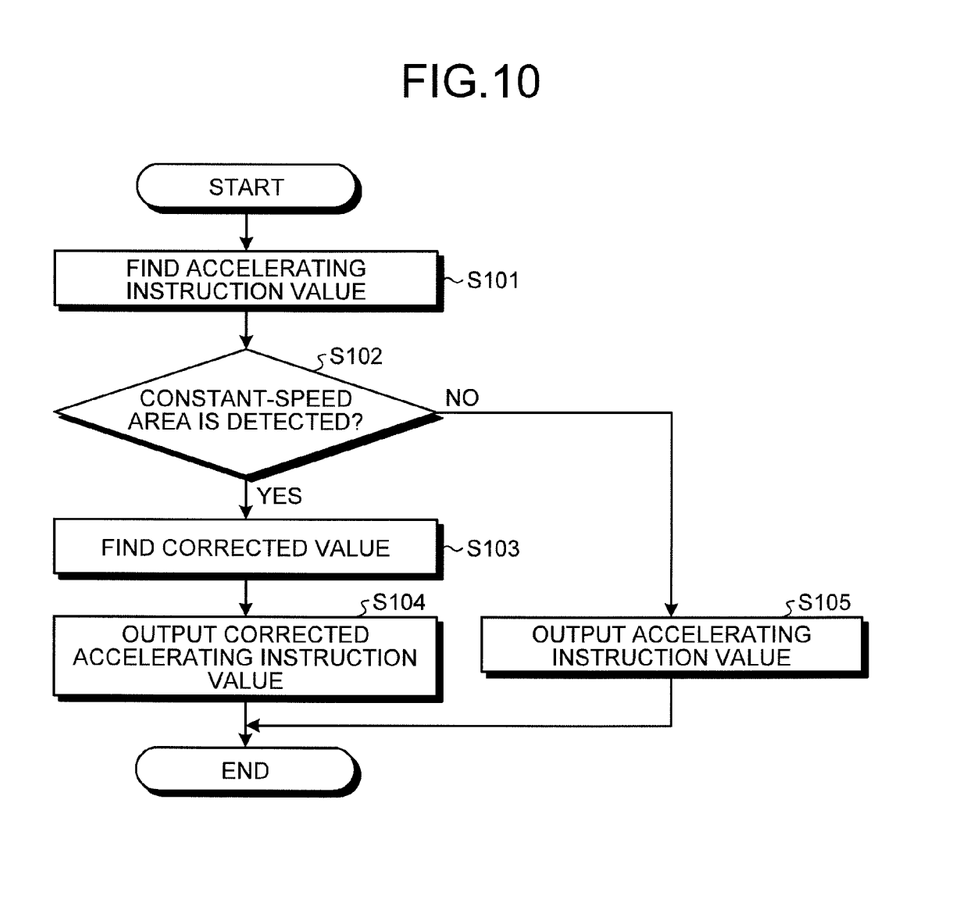
FIG. 10 is a flowchart illustrating an exemplary method for controlling a work machine according to the exemplary embodiment.

FIG. 10 is a flowchart illustrating an exemplary method for controlling a work machine according to the present exemplary embodiment. The method for controlling a work machine according to the present exemplary embodiment is a control for preventing undershoot of a traveling speed Vs, which is realized by the control system 20.

In step S101, the accelerating instruction value calculation unit 47 of the control device 25 in the control system 20 illustrated in FIG. 5 finds an accelerating instruction value Si. In step S102, when the detection unit 41A detects a constant-speed area ALT (step S102, Yes), in step S103, the control device 25 in the control system 20 illustrated in FIG. 5, more specifically the corrected value calculation unit 44 finds an acceleration corrected value Cv. In step S104, the control device 25 in the control system 20 illustrated in FIG. 5, more specifically the accelerating instruction value output unit 41B outputs a corrected accelerating instruction value Sc obtained by adding the corrected value Cv to the accelerating instruction value Si to the drive device 24.

In step S102, when the detection unit 41A does not detect a constant-speed area ALT (step S102, No), in step S105, the control device 25 in the control system 20 illustrated in FIG. 5, more specifically the accelerating instruction value output unit 41B outputs the accelerating instruction value Si found in step S101 to the drive device 24.

Figure 11:
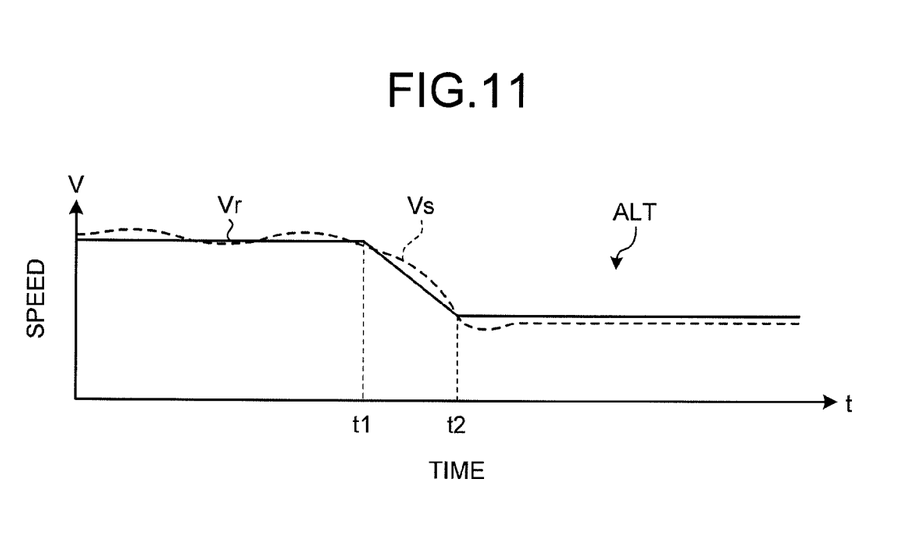
FIG. 11 is a diagram illustrating a relationship between a traveling speed as well as a target traveling speed and a time when a dump truck controlled in a method for controlling a work machine according to the exemplary embodiment travels in a constant-speed area.
Figure 12:
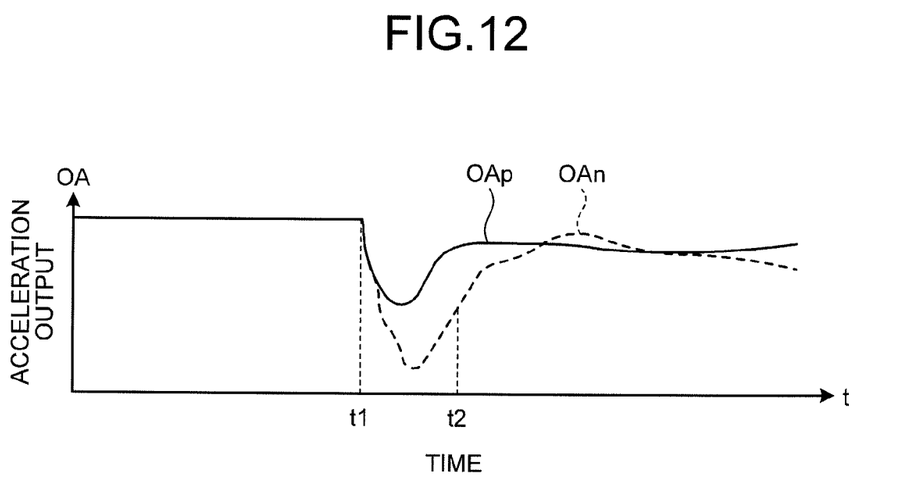
FIG. 12 is a diagram illustrating a relationship between an output acceleration and a time when a dump truck travels in a constant-speed area.

FIG. 11 is a diagram illustrating a relationship between a traveling speed Vs as well as a target traveling speed Vr and a time t when the dump truck 2 controlled in the method for controlling a work machine according to the present exemplary embodiment travels in a constant-speed area ALT. The vertical axis in FIG. 11 indicates a speed V, and the horizontal axis indicates a time t. FIG. 12 is a diagram illustrating a relationship between an output acceleration OA and a time t when the dump truck 2 travels in a constant-speed area ALT. The vertical axis in FIG. 12 indicates an output acceleration OA, and the horizontal axis indicates a time t. The output acceleration OA is output of the accelerating instruction value output unit 41B, which is an accelerating instruction value Si or a corrected accelerating instruction value Sc. An output acceleration OAp indicated in a solid line in FIG. 12 is caused by the method for controlling a work machine according to the present exemplary embodiment, and an output acceleration OAn indicated in a broken line is not caused by the method for controlling a work machine according to the present exemplary embodiment (a corrected value Cv is not added to an accelerating instruction value Si).

It can be seen from FIG. 11 that undershoot of a traveling speed Vs is more prevented in the dump truck 2 controlled in the method for controlling a work machine according to the present exemplary embodiment than in the dump truck 2 not controlled in the method for controlling a work machine according to the present exemplary embodiment illustrated in FIG. 7. Further, it can be seen from FIG. 12 that a degree of decrease in output acceleration OAp before the entry into a constant-speed area ALT is lower and a timing at which the output acceleration OAp increases is earlier in the dump truck 2 controlled in the method for controlling a work machine according to the present exemplary embodiment than in the dump truck 2 not controlled in the method for controlling a work machine according to the present exemplary embodiment illustrated in FIG. 7.

As described above, when detecting a constant-speed area ALT ahead in a traveling direction of the dump truck 2, the control device 25 corrects the accelerating instruction value Si, and thus can increase the accelerating instruction value Si by the corrected value Cv earlier before reaching the constant-speed area ALT, thereby reducing a degree of decrease in the accelerating instruction value Si. Consequently, the control device 25 can prevent undershoot of a traveling speed Vs when the dump truck 2 travels in the constant-speed area ALT. Undershoot of a traveling speed Vs is prevented thereby to reduce a change in traveling speed Vs of the dump truck 2. That is, a variation in the accelerating instruction value Si is prevented thereby to restrict a deterioration in fuel consumption of the dump truck 2. Further, a reduction in traveling speed can be restricted, which leads to an increase in productivity.

As described above, it is possible to prevent a traveling speed from lowering below a target traveling speed when an unmanned work machine controlled to travel in a mine at the set target traveling speed travels in an area in which the traveling speed is limited.

A constant-speed area ALT is not limited to ones according to the present exemplary embodiment. A constant-speed area ALT may include at least one of a speed-limited area in a mine where a work machine travels, a location where the carrying route HL illustrated in FIG. 1 is narrow, and a cross point between the carrying routes HL. Further, a constant-speed area ALT may be an area in which the dump truck 2 travels near a patrol car, or an area for entering the loading site LPA and the discharging site DPA.

<Variant>

The aforementioned present exemplary embodiment takes into consideration only a compensated actual deceleration of the decelerating dump truck 2 in order to calculate a corrected value Cv for an accelerating instruction value Si. Undershoot of a traveling speed Vs occurs when a trend of speed change (acceleration) rapidly varies in a short time, and a variation in acceleration needs to be taken into consideration for preventing undershoot. According to the aforementioned exemplary embodiment, as indicated by the deceleration area ADS and the constant-speed area ALT in FIG. 8, an acceleration in the constant-speed area ALT is almost zero, and thus only a deceleration (negative acceleration) may be taken into consideration.

For example, if the area (constant-speed area ALT) after the deceleration area ADS in FIG. 8 is where the target traveling speed Vr is not constant but linearly increases (constant-acceleration area), as in the aforementioned exemplary embodiment, undershoot cannot be sufficiently prevented even if only a deceleration (negative acceleration) of the dump truck 2 in the deceleration area ADS is taken into consideration. In this case, an acceleration in the area where the target traveling speed Vr linearly increases needs to be taken into consideration in addition to the deceleration of the dump truck 2.

Specifically, when the detection unit 41A detects that the dump truck 2 is in the deceleration area ADS at a current point of time and the area after the deceleration area ADS is a constant-speed area, the corrected value calculation unit 44 may find a corrected value Cv in consideration of an acceleration in the constant-speed area. Specifically, the corrected value calculation unit 44 finds, as an acceleration deviation De, a deceleration (absolute value) of the dump truck 2 in the deceleration area ADS added with an acceleration in the constant-acceleration area. The corrected value calculation unit 44 then multiplies the resultant acceleration deviation De by a total weight M of the dump truck 2, thereby calculating a drive force (torque) Tq required for the traveling of the dump truck 2 and finding a corrected value Cv. A linear increase in target traveling speed Vr in a constant-acceleration area assumes a case in which a target traveling speed Vr increases in a linear function of time, and a case in which a target traveling speed Vr increases while increasing and decreasing within a predetermined range with reference to the linear function of time.

According to the variant, similar methods to the above exemplary embodiment may be employed in addition to the detection method by the detection unit 41A and the method for calculating a corrected value Cv.

The description has been made assuming that the work machines are mining machines used in a mine by way of example according to the exemplary embodiment described above, but the work machines are not limited to mining machines, and may be work machines used in working sites and construction machines used in construction sites. The work machines include mining machines. The description has been made assuming that the "work machine control system" employs the system for controlling dump trucks in a mine on the ground by way of example according to the present exemplary embodiment, but the system is not limited thereto and may include a system for controlling other mining machines in a mine on the ground or work machines (such as wheel loaders) used in working sites.

The present exemplary embodiment has been described above, but the present exemplary embodiment is not limited by the aforementioned contents. The aforementioned components include ones easily assumed by those skilled in the art, substantially the same ones, or ones in an equivalent range. The aforementioned components can be combined as needed. At least one of various omissions, replacements, and changes of the components may be made without departing from the scope of the present exemplary embodiment.

REFERENCE SIGNS LIST

1 MANAGEMENT SYSTEM
2 DUMP TRUCK
3 WORK MACHINE
7 CONTROL FACILITY
10 MANAGEMENT DEVICE
20 WORK MACHINE CONTROL SYSTEM (CONTROL SYSTEM)
21 TRAVELING DEVICE
22 VEHICLE MAIN BODY
24 DRIVE DEVICE
25 CONTROL DEVICE
26 WHEEL
28 BRAKING DEVICE
29 STEERING DEVICE
31 TRAVELING SPEED DETECTOR
32 ACCELERATION DETECTOR
34 LOADING CAPACITY DETECTOR
35 POSITION DETECTOR
36 WIRELESS COMMUNICATION DEVICE
41 PROCESSING UNIT
41A DETECTION UNIT
41B ACCELERATING INSTRUCTION VALUE OUTPUT UNIT
42 ACCELERATION CHANGE AMOUNT CALCULATION UNIT
43 INTEGRATOR
44 CORRECTED VALUE CALCULATION UNIT
45 ADDITION PROCESSING UNIT
46 STORAGE UNIT
47 ACCELERATING INSTRUCTION VALUE CALCULATION UNIT
ALT CONSTANT-SPEED AREA
Cv CORRECTED VALUE
De ACCELERATION DEVIATION
RP TARGET TRAVELING COURSE
Sc CORRECTED ACCELERATING INSTRUCTION VALUE
Si ACCELERATING INSTRUCTION VALUE
Vr TARGET TRAVELING SPEED
Vs TRAVELING SPEED

The invention claimed is:

1. A work machine control system configured to control a drive device configured to drive a traveling device in a work machine, comprising:
   an acceleration change amount calculation unit configured to obtain an accelerating instruction value for controlling a traveling speed of the work machine based on a target traveling speed of the work machine;
   a detection unit configured to detect an area ahead in a traveling direction of the work machine, in which the target traveling speed is constant and is lower than a traveling speed at a current point of time;
   a corrected value calculation unit configured to, when the area is detected by the detection unit, obtain a corrected value for correcting the accelerating instruction value;
   an addition processing unit configured to add the accelerating instruction value and the corrected value to obtain a corrected accelerating instruction value; and
   an accelerating instruction value output unit configured to output the corrected accelerating instruction value to the drive device.

2. The work machine control system according to claim 1, wherein traveling condition information for defining a target traveling course of the work machine includes the target traveling speed, and
   the detection unit is configured to detect the area by using a plurality of the target traveling speeds corresponding to a plurality of points present ahead in a traveling direction of the work machine.

3. The work machine control system according to claim 2, wherein when a difference between a first target traveling speed at a first point present ahead in a traveling direction of the work machine and a second target traveling speed at a second point present ahead in the traveling direction of the work machine ahead of a first traveling condition information is less than a threshold, the detection unit determines that the area is detected.

4. The work machine control system according to claim 1, wherein when a deceleration of the work machine is a threshold or more, the detection unit determines that the area is detected.

5. The work machine control system according to claim 1, wherein the corrected value calculation unit is configured to obtain the corrected value by using an actual deceleration of the work machine.

6. The work machine control system according to claim 1, wherein the area includes at least one of a speed-limited area in a mine in which the work machine travels, a cross point, and a location in which a carrying route in the mine is narrow.

7. A work machine control system configured to control a drive device configured to drive a traveling device in a work machine, comprising:
   an acceleration change amount calculation unit configured to obtain an accelerating instruction value for controlling a traveling speed of the work machine based on a target traveling speed of the work machine;
   a detection unit configured to detect that the work machine is present in a deceleration area in which the target traveling speed decreases, and that a constant-acceleration area in which the target traveling speed linearly increases is present ahead in a traveling direction of the work machine;
a corrected value calculation unit configured to, when the area is detected by the detection unit, obtain a corrected value for correcting the accelerating instruction value;
an addition processing unit configured to add the accelerating instruction value and the corrected value to obtain a corrected accelerating instruction value; and
an accelerating instruction value output unit configured to output the corrected accelerating instruction value to the drive device.

8. The work machine control system according to claim 7, wherein the corrected value calculation unit is configured to obtain the corrected value by using an actual deceleration of the work machine and an acceleration in the constant-acceleration area.

9. A work machine including the work machine control system according to claim 7.

10. A work machine management system comprising:
a management device configured to output traveling condition information including the target traveling speed and a target traveling course of a work machine to the work machine according to claim 9.

11. A method for controlling a work machine, comprising:
detecting an area present ahead in a traveling direction of a work machine, in which a target traveling speed of the work machine is constant and is lower than a traveling speed at a current point of time;
when the area is detected, obtaining a corrected value for correcting the accelerating instruction value;
adding the corrected value and an accelerating instruction value for controlling a traveling speed of the work machine obtained based on the target traveling speed to obtain a corrected accelerating instruction value; and
outputting the corrected accelerating instruction value to a drive device configured to drive a traveling device in the work machine.

12. A work machine including the work machine control system according to claim 1.

13. A work machine management system comprising:
a management device configured to output traveling condition information including the target traveling speed and a target traveling course of a work machine to the work machine according to claim 12.

* * * * *